(12) United States Patent
Howe (10) Patent No.: US 6,477,782 B1
(45) Date of Patent: Nov. 12, 2002

(54) DEVICE AND METHOD FOR GAUGING AN ANGLED SURFACE AND SETTING A TOOL TO MATCH THE BISECTION OF THE ANGLED SURFACE

(76) Inventor: Richard Howe, 30 Farber Dr., Chalfont, PA (US) 18914

( * ) Notice: Subject to any disclaimer, the term of this patent is extended or adjusted under 35 U.S.C. 154(b) by 0 days.

(21) Appl. No.: 09/575,932

(22) Filed: May 23, 2000

(51) Int. Cl.$^7$ .............................. B43L 7/10; G01B 5/24
(52) U.S. Cl. ........................................ 33/455; 33/471
(58) Field of Search ..................... 33/471, 1 D, 1 N, 33/1 PT, 1 AP, 418, 419, 420, 421, 452, 453, 455, 456, 464, 465, 472, 473, 534, 535, 538, 520, 495–500

(56) References Cited

U.S. PATENT DOCUMENTS

| | | | |
|---|---|---|---|
| 521,414 A | * 6/1894 | Langlais | ........................ 33/455 |
| 541,514 A | * 6/1895 | Walker | ........................ 33/455 |
| 684,367 A | * 10/1901 | Green | ........................ 33/455 |
| 761,336 A | * 5/1904 | Tague | ........................ 33/455 |
| 797,453 A | * 8/1905 | Nagel | ........................ 33/455 |
| 821,374 A | * 5/1906 | Parks | ........................ 33/455 |
| 925,807 A | * 6/1909 | Green | ........................ 33/455 |
| 939,405 A | * 11/1909 | Erikson et al. | ................ 33/455 |
| 1,135,743 A | 4/1915 | Walker | |
| 1,207,564 A | * 12/1916 | Sweezey | ........................ 33/455 |
| 1,320,320 A | * 1/1919 | Crowley, Jr. | .................. 33/455 |
| 1,791,221 A | * 2/1931 | Murray | ........................ 33/455 |
| 3,906,638 A | 9/1975 | Romano | |
| 4,060,900 A | 12/1977 | Greenwood | |
| 4,481,720 A | 11/1984 | Sury | |
| 4,535,542 A | 8/1985 | Liu et al. | |

* cited by examiner

Primary Examiner—Christopher W. Fulton
(74) Attorney, Agent, or Firm—LaMorte & Associates (57) ABSTRACT

A gauge device and the associated method of using the gauge device to set the cut angles of a carpenter's mitering tools. The device includes a handle that has a longitudinal axis. A first arm is pivotably connected to the handle. The first arm has at least one straight edge. The straight edge of the first arm creates a first angle relative the longitudinal axis of the handle. A second arm is also pivotably connected to the handle. The second arm has a straight edge that creates a second angle relative the longitudinal axis of the handle. A spanning mechanism is provided that selectively maintains symmetry between the first angle of the first arm and the second angle of the second arm. The second arm is selectively detachable from the spanning mechanism and is movable to a retracted position. The second arm is retracted when the gauge device is used to set the cutting angle on a mitering tool.

8 Claims, 6 Drawing Sheets

Fig. 6

DEVICE AND METHOD FOR GAUGING AN ANGLED SURFACE AND SETTING A TOOL TO MATCH THE BISECTION OF THE ANGLED SURFACE

BACKGROUND OF THE INVENTION

1. Field of the Invention

In general, the present invention relates to gauges used to measure the angle between converging or diverging surfaces. More particularly, the present invention relates to hand held tools used in carpentry that are used to measure angles so that various carpentry tools can be set to the measured angles and produce accurate mitered cuts.

2. Description of the Prior Art

Carpenters are often required to join pieces of wood at corners. When joining pieces of wood at an angle, the ends of the pieces of the wood must be mitered in order to match the angle of the corner and produce an aesthetically pleasing joint. When corners meet at a right angle, the mitering process is relatively simple. However, when pieces of wood are joined at an acute angle or at an obtuse angle, the task of creating a proper joint becomes more complex.

In carpentry, the first step needed to create a proper joint between converging surfaces is to measure the angle between the converging surfaces. Once the angle is known, the measured angle is bisected and the carpenter's mitering tools are set to the value of the bisected angle. Both converging pieces of wood are then cut to the bisected angle. When the two pieces of wood are joined, the pieces of wood meet at an angle equal to the measured angle and a proper joint is created.

The prior art is replete with various different types of gauges that are used to measure the angle between converging or diverging surfaces. Early carpentry tools used to measure angles had two articulated arms that were joined to a common pivot point. The arms were rotated to match the angle of the surface being measured. A protractor was then used to measure the angle between the arms, so a carpenter new at what angle to set his tools. Such prior art gauging tools are exemplified by U.S. Pat. No. 1,135,743 to Walker, entitled Combination Tool.

In the years that followed, gauging tools have been improved in that a protractor has been incorporated into the gauge. As such, a carpenter can read an angle directly from the gauge rather than having to use both a gauge and a protractor. Such prior art gauges are exemplified by U.S. Pat. No. 4,060,900 to Greenwood, entitled Angle Measuring Device and U.S. Pat. No. 4,535,542 to Liu, entitled Vernier Gauge.

A problem associated with the use of such prior art angle gauges is tolerance error. When a carpenter measures an angle, the measured angle contains some error that corresponds to the quality of the gauge being used and the care taken by the carpenter when measuring the angle. Additionally, the measured angle is then divided in half, which often produces rounding errors. The calculated value of the bisected angle is then used to set the carpenter's mitering tools. The tools often do not have highly accurate angle setting devices and the mitering tool may have a tolerance error of ±2 degrees. The combined errors created by the gauge, the mitering tool and rounding errors often cause the resulting joint to be less than perfect. As such, a carpenter must repeat the process or subject the wood to a secondary cutting process until a joint of satisfactory quality is obtained.

If a carpenter is making high quality furniture, picture frames or trim where a very small margin of error is acceptable, the carpenter typically uses very high quality gauges and mitering tools. Such high quality tools do produce accurate cuts. However, such tools are very expensive and are not economically practical to many professional and amateur carpenters.

A need therefore exists for a device and method for accurately gauging an angle and setting inexpensive mitering tools to the measured angle, thereby enabling accurate miters to be dependably produced from common equipment. This need is met by the present invention as it is described and claimed below.

SUMMARY OF THE INVENTION

The present invention is a gauge device and the associated method of using the gauge device to set the cut angles of a carpenter's mitering tools. The device includes a handle that has a longitudinal axis. A first arm is pivotably connected to the handle. The first arm has at least one straight edge. The straight edge of the first arm creates a first angle with the longitudinal axis of the handle. A second arm is also pivotably connected to the handle. The second arm has a straight edge that creates a second angle with the longitudinal axis of the handle. A spanning mechanism is provided that selectively maintains symmetry between the first angle of the first arm and the second angle of the second arm. The second arm is selectively detachable from the spanning mechanism and is movable to a retracted position. The second arm is retracted when the gauge device is used to set the cutting angle on a mitering tool.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Figure 1:
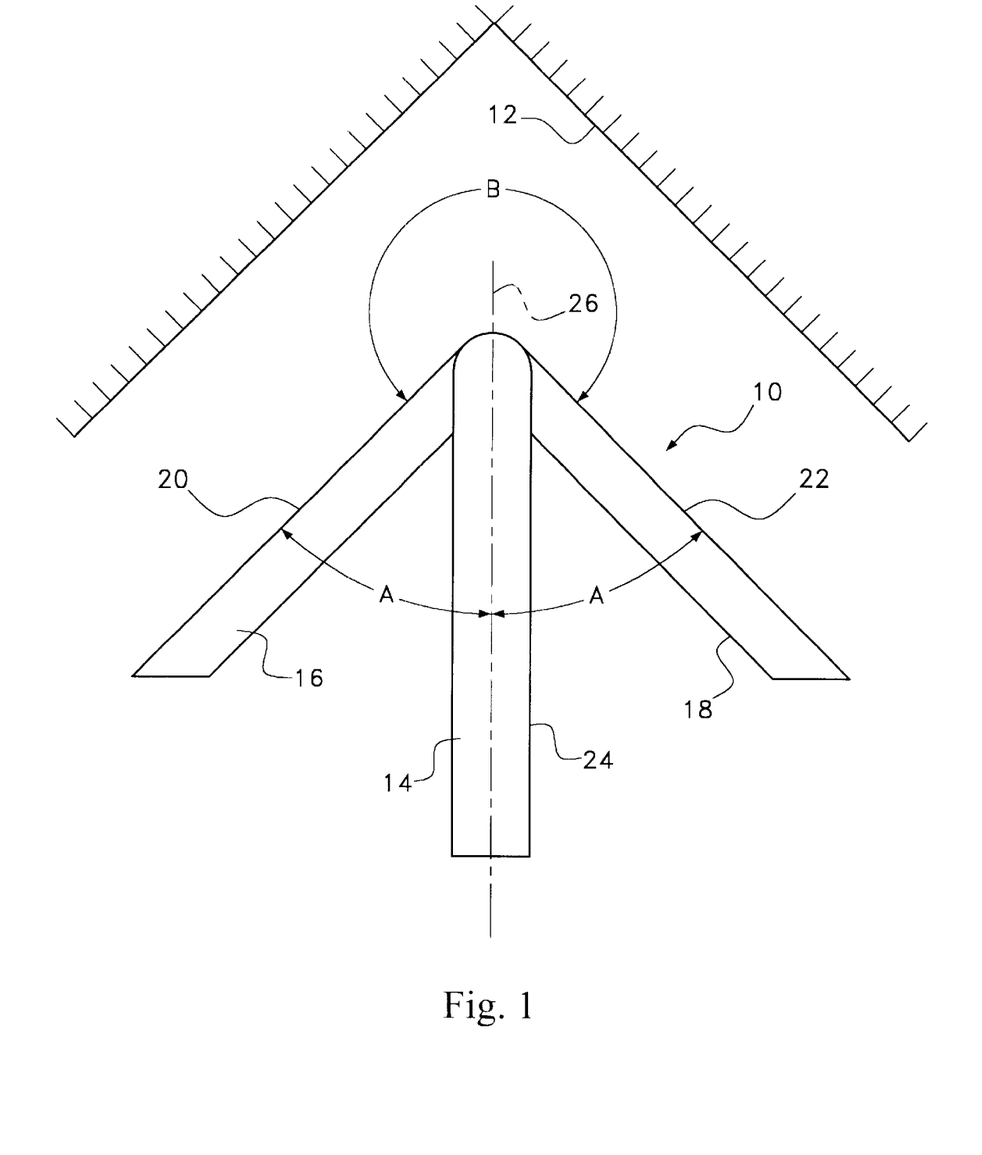
FIG. 1 is a front view of a first embodiment of a gauge device shown in conjunction with an angled surface that is to be gauged.

Referring to FIG. 1, a first embodiment of the present invention gauge device 10 is shown in conjunction with an angled surface 12 that is to be gauged. The gauge device 10 includes a handle 14, a first arm element 16 and a second arm element 18. The first arm element 16 and the second arm element 18 are pivotably connected to the handle 14. As such, the two arm elements 16, 18 can be pivotably rotated into a configuration that matches the angled surface 12 being gauged.

The first arm element 16 has a first flat edge 20 that faces away from the handle 14. Similarly, the second arm element 18 has a second flat edge 22 that faces away from the handle 14. The handle 14 also has a flat edge 24, which lays adjacent the second arm element 18. The handle 14 is elongated and has a central longitudinal axis 26. The flat edge 24 of the handle 14 lays parallel to the longitudinal axis 26 of the handle 14. The first arm element 16 and the second arm element 18 symmetrically extend from the handle 14. As such, the angle A between the first flat edge 20 on the first arm element 16 and the longitudinal axis 26 of the handle 14 remains the same as the angle A between the second flat edge 22 on the second arm element 18 and the longitudinal axis 26 of the handle 14. The symmetry between the longitudinal axis 26 of the handle 14 and the two flat edges 20, 22 of the arm elements 16, 18 is maintained by a spanning mechanism, that will later be explained. Accordingly, no matter what angle the first arm element 16 is adjusted to, the second arm element 18 will automatically extend to the same angle as the first arm element 16.

The arm elements 16, 18 are adjusted so that the flat edges 20, 22 of the arm elements 16, 18 lay flush against the edges of the angled surface 12 being gauged. Once the flat surfaces 20, 22 of the arm elements 16, 18 match the angled surface 12, the arm elements 16, 18 are locked into place by a locking mechanism, that will also later be explained.

Once locked into place, the gauge device 10 is removed from the angled surface 12. The angle B between the two flat edges 20, 22 of the two arm elements 16, 18 represents the angle between the surfaces of the angled surface 12 that was just gauged. The measurement is nearly exact because the gauge device 10 is pressed against the angled surface 12 and the arm elements 16, 18 are locked into place when the arm elements 16, 18 contact the angled surface 12.

Since the first arm element 16 and the second arm element 18 are symmetrically disposed on either side of the longitudinal axis 26 of the handle 14, the angle A between the first flat edge 20 on the first arm element 16 and the longitudinal axis 26 represents the exact bisection of the angle B between the two flat edges 20, 22 of the two arm elements 16, 18.

Figure 2:
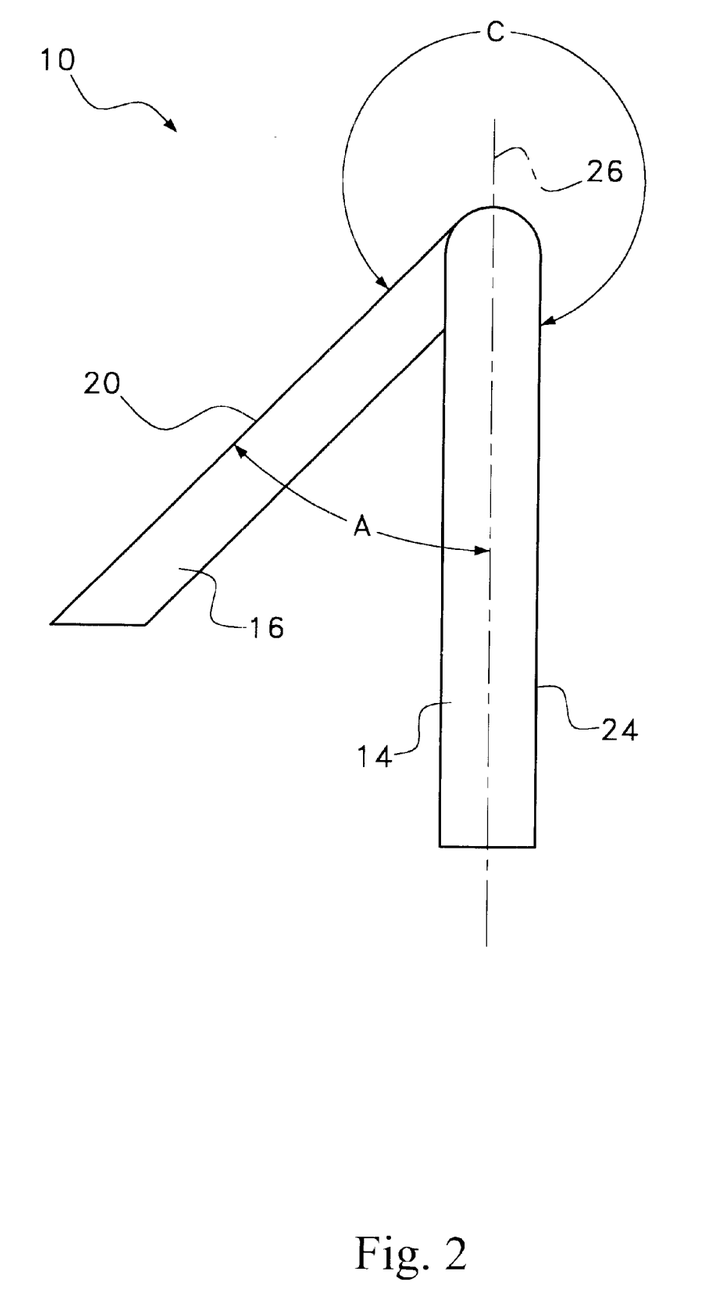
FIG. 2 is a front view of the embodiment of the gauge device shown in FIG. 1 wherein the second arm element has been retracted.

In the present invention, the second arm element 18 can be selectively disengaged from the spanning mechanism that maintains symmetry between the first arm element 16 and the second arm element 18. Once disengaged, the second arm element 18 can be either removed or retracted. The result is the configuration shown in FIG. 2. Referring to FIG. 2, it can be seen that once the second arm element 18 (FIG. 1) is removed or retracted, the first arm element 16 remains in the same location. As such, the angle A between the flat edge 20 on the first arm element 16 and the longitudinal axis 26 of the handle 14 remains equal to the bisection of the gauged angle B (FIG. 1) measured by the gauge device 10. However, the angle C between the flat edge 20 of the first arm element 16 and the flat edge 24 of the handle 14 is equal to the bisection of angle A plus 180°.

Figure 3:
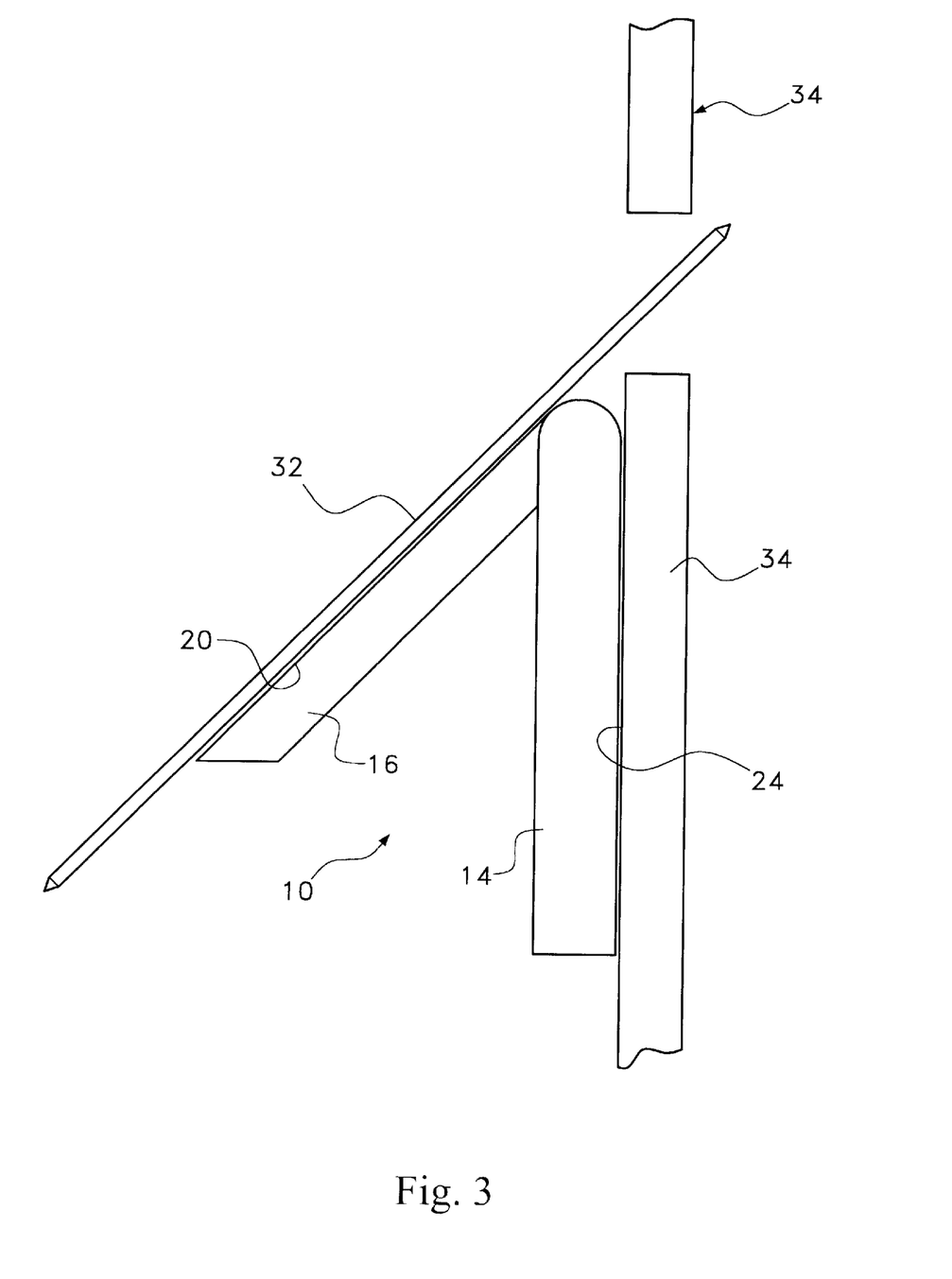
FIG. 3 is a top view of a power miter box, wherein the gauge device of FIG. 2 is being used to set the angle of the cutting blade.

Referring to FIG. 3, it can be seen that the gauge device 10 can be used to set a mitering tool 30. In the illustration of FIG. 3, the mitering tool 30 is a power miter box having a blade 32 and a straight support fence 34. The angle between the blade 32 and the support fence 34 can be altered to different angles. To utilize the present invention gauge device 10, the flat edge 24 of the handle 14 is placed flush against the support fence 34 of the power miter box. The blade 32 of the power miter box is then adjusted to meet the angle of the flat edge 20 of the first arm element 16. If the power miter box has an adjustment gauge, the adjustment gauge is ignored. Rather, the blade 32 is adjusted until the blade 32 lays flush against the flat edge 20 of the first arm element 16. Once in abutment with the first arm element 16, the blade 32 is locked into place.

Once the blade 32 of the power miter box is locked into place, the gauge device 10 is removed. Within a very small margin of error, the resulting angle between the blade 32 and the support fence 34 is nearly exactly the angle between the flat edge 20 of the first arm element 16 and the longitudinal axis of the handle 14. Accordingly, any wood cut in the power miter box will be cut at an angle equal to the bisected angle of the actual angle measured by the gauge device 10, as is required for making a proper joint.

In FIG. 3, the use of a power miter box is merely exemplary. The gauge device 10 can be used to set any cutting tool where the blade of the tool and a support fence on the tool are adjustable. As such, the gauge device can be used to set a table saw, router table, shaper table, band saw, drum sander and the like.

Furthermore, in the embodiment of the gauge device shown in FIG. 1 and FIG. 2, the gauge device 10 was used to measure an angled surface that resulted in the angle A, between the first arm element 16 and the longitudinal axis 26 of the handle 14 being an acute angle. The gauge device 10 is also capable of gauging more salient angled surfaces, wherein the angle A between the first arm element 16 and the longitudinal axis 26 of the handle would be an obtuse angle.

Figure 4:
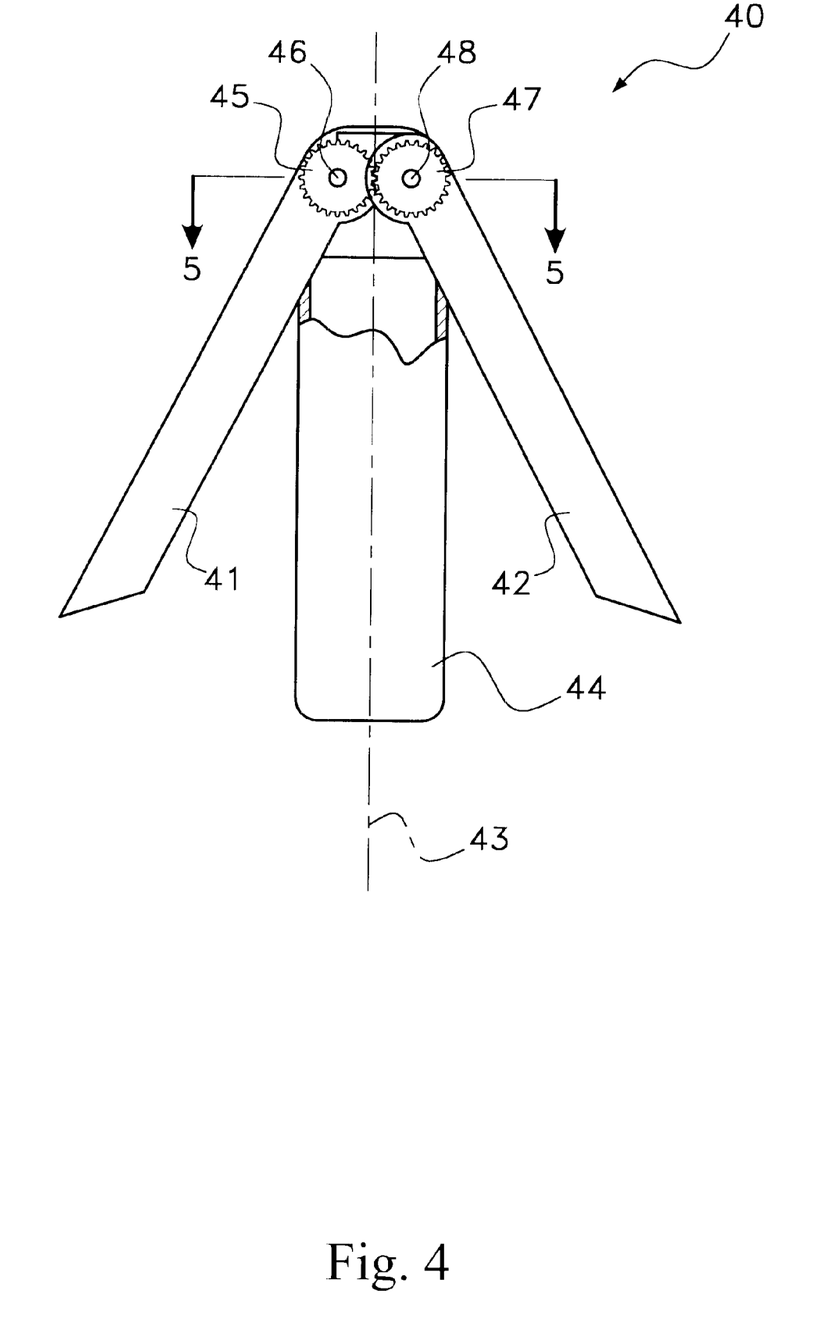
FIG. 4 is a partially cross-sectioned forward view of a gauge device in accordance with the present invention.

Referring now to FIG. 4, an alternate embodiment of the present invention gauge device 40 is shown. In this embodiment, the spanning mechanism is shown. The spanning mechanism is the device that maintains the first and second arm elements 41, 42 symmetrically around the longitudinal axis 43 of the handle 44. In the shown embodiment, a first gear 45 is mounted to the end of the first arm element 41. The first gear 45 is concentrically positioned with the first pivot post 46 that joins the first arm element 41 to the handle 44. A second gear 47 is mounted to the end of the second arm element 42. The second gear 47 is concentrically positioned with a second pivot post 48 that joins the second arm element 42 to the handle 44. The two gears 45, 47 intermesh and have both the same diameter and tooth pitch. As a result, when the first arm element 41 is rotated upwardly, the gears turn and the second arm element 42 is caused to move in a symmetric manner.

The handle 44 is hollow. As such, when the first arm element 41 and/or the second arm element 42 is retracted, the retracted arm element or elements can be retracted into the handle 44.

Figure 5:
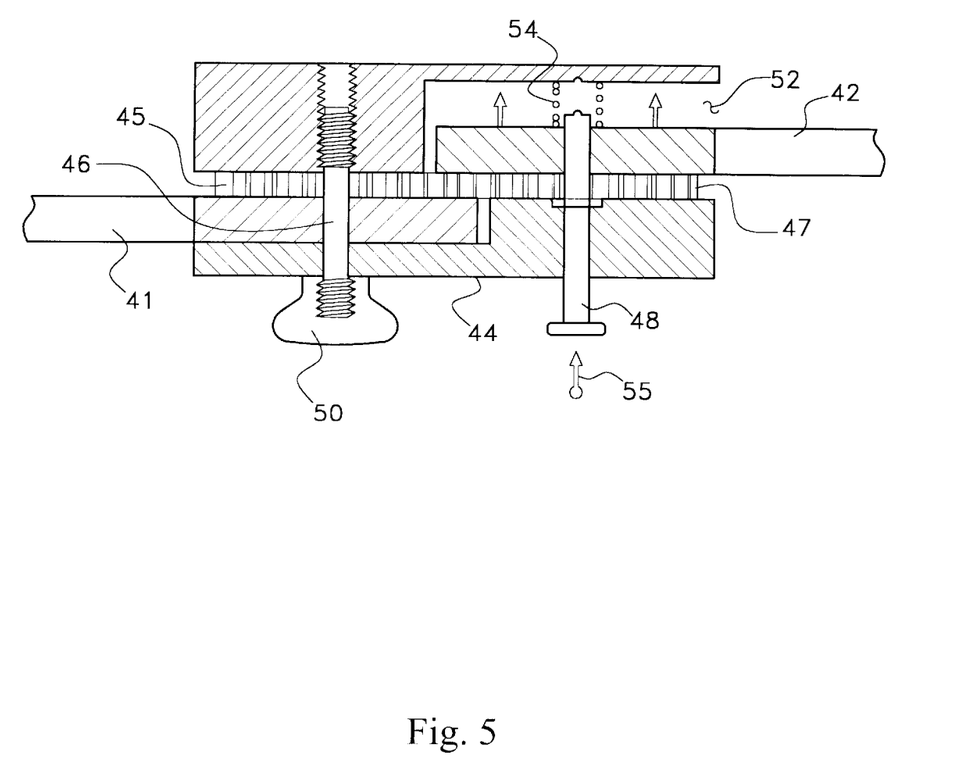
FIG. 5 is a cross-sectional view of the embodiment of FIG. 4, viewed along section line 5—5.

Referring to FIG. 5, it can be seen that a locking nut 50 is threaded onto the first pivot post 46 that joins the first arm element 41 and the first gear 45 to the handle 44. By selectively tightening the locking nut 50, the first arm element 41 can be locked into one set position relative the handle 44. As such, the locking nut 50 serves as a locking mechanism for locking the first locking arm 41 in place after the gauge device is configured to match an angled surface.

The second arm element 42 extends into an open slot 52 in the handle 44. The width of the slot 52 is wider than the combined widths of the second arm element 42 and the second gear 47 that is coupled to the second arm element 42. The second arm element 42 and the second gear 47 are biased against one side of the slot 52 by a spring 54. When biased against the side of the slot 52 by the spring 54, the second gear 47 is intermeshed with the first gear 45 and the spanning mechanism is operational. However, the second pivot post 48 has a flat head that extends out of the handle 44. When the flat head of the second pivot post 48 is depressed in the direction of arrow 55, the second arm element 42 and the second gear element 47 are pushed to the opposite side of the slot 52 against the bias of the spring 54. Once moved against the bias of the spring 54, the second gear 47 disengages from the first gear 45. The second arm element 42 is therefore free to move without effecting the first arm element 41. The ability of the second arm element 42 to disengage from the spanning mechanism, enables the second arm element 42 to be moved to a retracted position without effecting the first arm element 41.

Figure 6:
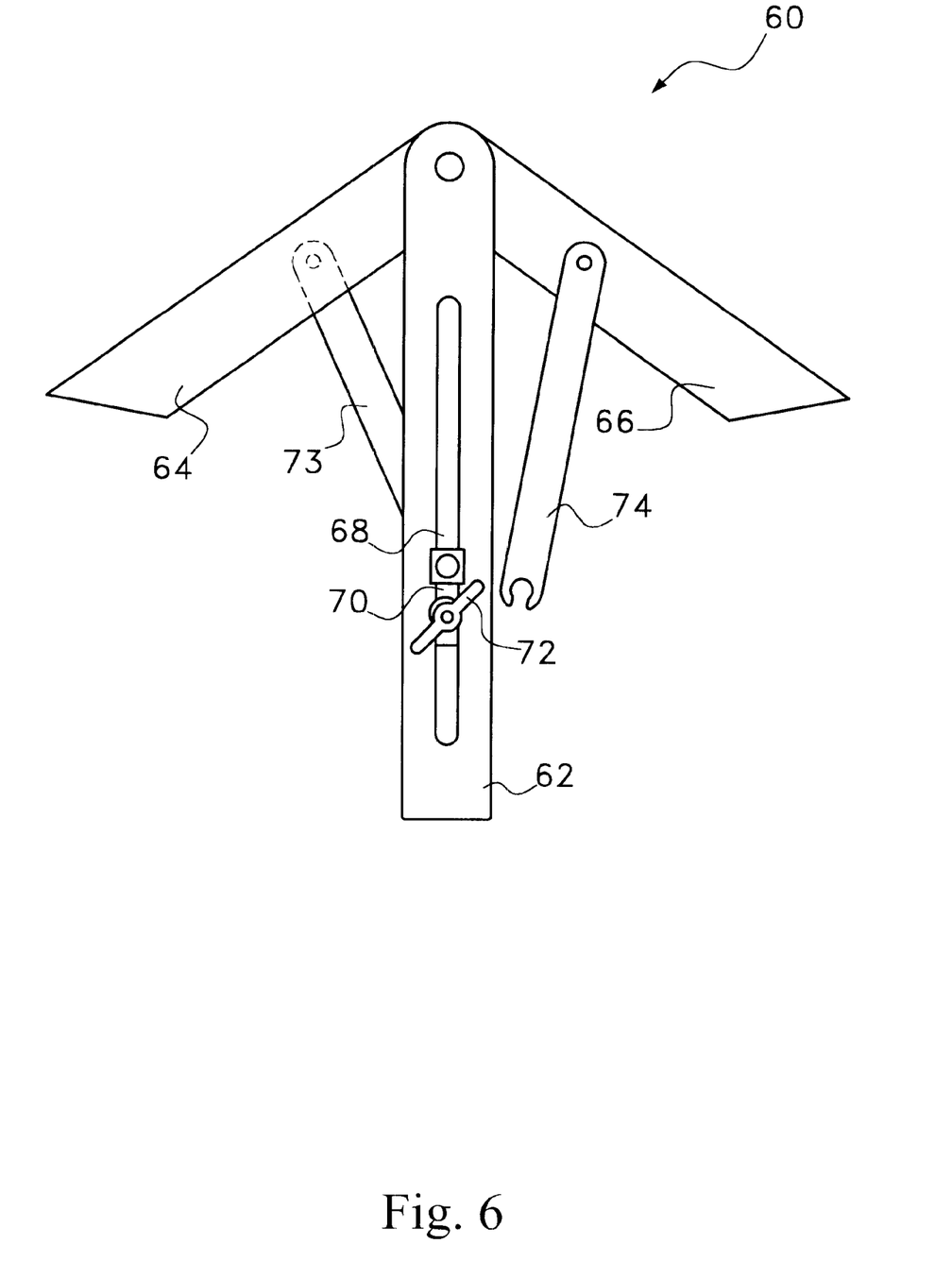
FIG. 6 is a front view of an alternate embodiment of an angle gauge in accordance with the present invention.

Referring now to FIG. 6, another alternate embodiment of the present invention gauge device 60 is shown. Like with previous embodiments, the gauge device 60 includes an elongated handle 62 and two arm elements 64, 66. The two arm elements 64, 66 are pivotably connected to the handle 62. The handle 62 contains a slot 68 that runs along the longitudinal axis of the handle 62. Within the slot 68 is positioned a slide element 70. The slide element 70 includes a locking nut 72 that can be used to lock the slide element 70 in place within the slot 68. When the locking nut 72 is not tightened, the slide element 70 is free to move back and forth along the length of the slot 68.

In the embodiment of FIG. 6, the spanning mechanism includes two linkage elements 73, 74. The first linkage element 73 is pivotably connected at one end to the first arm element 64. The opposite side of the first linkage element 73 is pivotably connected to the slide element 70. Accordingly, as the slide element 70 is moved back and forth within the slot 68, the linkage arm 73 causes the first arm element 64 to rise and fall.

The second linkage element 74 is pivotably connected at one end to the second arm element 66. The opposite side of the second linkage element 74 is pivotably connected to the slide element 70. Accordingly, as the slide element 70 is moved back and forth within the slot 68, the linkage arm 74 causes the second arm element 66 to rise and fall.

The first linkage element 73 and the second linkage arm element 74 are the same length and engage the first and second arm elements 64, 66 at the same points, respectively. Accordingly, as the slide element 70 moves up and down in the slot 68, the first arm element 64 and the second arm element 66 move in unison and the angle between the arm elements and the longitudinal axis of the handle remains the same.

The second linkage element 74 can be selectively disconnected from the slide element 70. Once the second linkage element 74 is disconnected from the slide element 70, the second arm element 66 is free to move independently of both the slide element 70 and the first arm element 64.

To use the gauge device 60, both linkage elements 73, 74 are coupled to the slide element 70. The first arm element 64 and the second arm element 66 are then configured to match the angle of a surface against which the arm elements 64, 66 are pressed. Once at a proper orientation, the slide element 70 is locked into place on the handle 62 using the locking nut 72. This locks the first arm element 64 and the second arm element 66 into a set position. The second linkage arm 74 is then detached from the slide element 70. This enables the second arm element 66 to move independently, wherein the second arm element 66 can be moved to a retracted position. Once the second arm element 66 is retracted, the first arm element 64 and the handle 62 are used to set a miter tool in that same way as has been previously described.

It will be understood that the embodiments of the present invention gauge device that are described and illustrated herein are merely exemplary and a person skilled in the art can make many variations to the embodiment shown without departing from the scope of the present invention. For example, there are many known mechanisms that can be adapted for use as spanning mechanisms or locking mechanisms to the gauge device. Furthermore, the length of the arm elements and length of the handle can be altered as desired. The features required for the operation of the gauge element are two arm elements, a handle, a spanning mechanism that moves the arm elements symmetrically from the handle, and a means to remove or retract one of the arms. All variations, modifications and alternate embodiments to these structures that serve the stated function are intended to be included within the scope of the present invention as defined by the appended claims.

What is claimed is:

1. A gauge device, comprising:

a handle having a longitudinal axis;

a first arm having a first end, a second end and a first straight edge disposed therebetween, said first end having a first geared surface thereon, wherein said first end of said first arm is pivotably coupled to said handle, whereby said first straight edge creates a first angle with said longitudinal axis of said handle;

a second arm having a first end, a second end and a second straight edge disposed therebetween, said first end having a second geared surface thereon, wherein said second end of said second arm is pivotably coupled to said handle, whereby said second straight edge creates a second angle with said longitudinal axis of said handle;

a mechanism for selectively altering the gauge device between a meshed condition, where said first geared surface meshes with said second geared surface, and an unmeshed condition, where said first geared surface does not engage said second geared surface, wherein when in said unmeshed condition said second arm is selectively movable to a retracted position, thereby changing said second angle without effecting said first angle.

2. The device according to claim 1, wherein said handle has a third straight edge that is parallel to said longitudinal axis of said handle.

3. The device according to claim 2, wherein when said second arm is in said retracted position said second arm retracts behind said third straight edge.

4. The device according to claim 1, wherein said handle includes a chamber for receiving said second arm when said second arm is in said retracted position.

5. The device according to claim 1, wherein said first arm and said second arm are retractable into said handle.

6. The device according to claim 1, further including a locking mechanism for locking said first arm into a fixed position relative said handle.

7. A method of gauging the angle of an angled surface and setting a tool to the bisection of that angle, said method including the step of:

providing a gauge having a first arm element, a second arm element, a handle, and a spanning mechanism, wherein said spanning mechanism enables said first arm element and said second arm element to symmetrically extend from said handle;

adjusting said first arm element and said second arm element to the angle of the angled surface;

detaching said second arm element from said spanning mechanism;

retracting the second arm element without effecting said first arm element;

gauging a tool using the handle and the first arm element, wherein the angle between the handle and the first arm element represents the bisected angle of the angled surface.

8. The method according to claim 7, wherein said step of retracting the second arm element includes retracting the second arm element into said handle.

* * * * *